United States Patent
Humblet

(10) Patent No.: US 8,379,625 B2
(45) Date of Patent: Feb. 19, 2013

(54) OBTAINING TIME INFORMATION IN A CELLULAR NETWORK

(75) Inventor: Pierre A. Humblet, Cambridge, MA (US)

(73) Assignee: Airvana LLC, Chelmsford, MA (US)

( * ) Notice: Subject to any disclaimer, the term of this patent is extended or adjusted under 35 U.S.C. 154(b) by 1058 days.

(21) Appl. No.: 12/343,850

(22) Filed: Dec. 24, 2008

(65) Prior Publication Data

US 2009/0156195 A1 Jun. 18, 2009

Related U.S. Application Data

(63) Continuation-in-part of application No. 11/958,975, filed on Dec. 18, 2007.

(51) Int. Cl.
*H04J 3/06* (2006.01)

(52) U.S. Cl. .......................... 370/350; 370/324

(58) Field of Classification Search .......................... None
See application file for complete search history.

(56) References Cited

U.S. PATENT DOCUMENTS

| | | | | |
|---|---|---|---|---|
| 4,677,617 A * | 6/1987 | O'Connor et al. | ............ | 370/478 |
| 5,172,396 A * | 12/1992 | Rose et al. | ............ | 375/356 |
| 5,363,110 A * | 11/1994 | Inamiya | .............. | 342/357.31 |
| 5,736,964 A * | 4/1998 | Ghosh et al. | .............. | 342/457 |
| 5,812,749 A * | 9/1998 | Fernandez et al. | ............ | 714/4.4 |
| 5,898,929 A * | 4/1999 | Haartsen | .............. | 455/462 |
| 6,369,751 B1 | 4/2002 | Naruse | .............. | 342/357.42 |
| 6,433,739 B1 * | 8/2002 | Soliman | .............. | 342/387 |
| 6,438,702 B1 * | 8/2002 | Hodge | .............. | 713/400 |
| 6,477,154 B1 * | 11/2002 | Cheong et al. | .............. | 370/328 |
| 6,549,559 B2 | 4/2003 | Kamgar et al. | | |
| 6,581,110 B1 * | 6/2003 | Harif et al. | .............. | 709/248 |
| 6,711,144 B1 | 3/2004 | Kim et al. | | |
| 6,731,618 B1 | 5/2004 | Chung et al. | | |
| 6,741,862 B2 | 5/2004 | Chung et al. | | |
| 6,781,999 B2 | 8/2004 | Eyuboglu et al. | | |
| 6,813,478 B2 * | 11/2004 | Glazko et al. | .............. | 455/67.14 |
| 7,009,948 B1 * | 3/2006 | Carlsson et al. | .............. | 370/329 |
| 7,170,871 B2 | 1/2007 | Eyuboglu et al. | | |
| 7,200,391 B2 | 4/2007 | Chung et al. | | |
| 7,242,958 B2 | 7/2007 | Chung et al. | | |
| 7,277,446 B1 | 10/2007 | Abi-Nassif et al. | | |
| 7,299,278 B2 | 11/2007 | Ch'ng | | |
| 7,301,987 B2 * | 11/2007 | Edlis et al. | .............. | 375/140 |
| 8,138,945 B2 * | 3/2012 | Hayakawa et al. | ...... | 340/870.39 |
| 2001/0010505 A1 * | 8/2001 | Naruse | .............. | 342/357.12 |
| 2001/0026547 A1 * | 10/2001 | Moulsley et al. | ............ | 370/347 |

(Continued)

FOREIGN PATENT DOCUMENTS

GB 2452688 3/2009

OTHER PUBLICATIONS

Office action from U.S. Appl. No. 11/958,975, mailed Nov. 30, 2011 (9 pages).

(Continued)

*Primary Examiner* — Bunjob Jaroenchonwanit
(74) *Attorney, Agent, or Firm* — Fish & Richardson P.C.

(57) ABSTRACT

A method, performed by an access point of a cellular network, obtains time information by identifying a control channel cycle boundary; at a beginning of the control channel cycle boundary, sending a request to a time server; receiving a response from the time server, the request including a server time; and obtaining the timing information using the server time. Obtaining the timing information includes using the server time and a first reference time to obtain an integer and a fraction; using the fraction to obtain a time difference; and using the time difference to obtain the timing information.

16 Claims, 8 Drawing Sheets

U.S. PATENT DOCUMENTS

| | | | |
|---|---|---|---|
| 2001/0046872 A1* | 11/2001 | Masuda | 455/502 |
| 2002/0014990 A1* | 2/2002 | Kimura | 342/458 |
| 2002/0072853 A1* | 6/2002 | Sullivan | 701/213 |
| 2002/0110151 A1* | 8/2002 | Dickey | 370/503 |
| 2002/0129291 A1* | 9/2002 | Gonzalez | 713/400 |
| 2002/0196749 A1 | 12/2002 | Eyuboglu et al. | |
| 2003/0012174 A1* | 1/2003 | Bender et al. | 370/347 |
| 2003/0016702 A1* | 1/2003 | Bender et al. | 370/522 |
| 2003/0026240 A1* | 2/2003 | Eyuboglu et al. | 370/349 |
| 2003/0040869 A1* | 2/2003 | Nir et al. | 701/214 |
| 2003/0084190 A1* | 5/2003 | Kimball | 709/248 |
| 2003/0100311 A1 | 5/2003 | Chung et al. | |
| 2003/0103475 A1* | 6/2003 | Heppe et al. | 370/321 |
| 2004/0029591 A1* | 2/2004 | Chapman et al. | 455/452.1 |
| 2004/0042576 A1* | 3/2004 | Anderson | 375/365 |
| 2004/0085938 A1* | 5/2004 | Tiedemann et al. | 370/335 |
| 2004/0098506 A1* | 5/2004 | Jean | 709/245 |
| 2004/0120386 A1* | 6/2004 | Grilli et al. | 375/148 |
| 2004/0125822 A1* | 7/2004 | Jun et al. | 370/503 |
| 2004/0131032 A1* | 7/2004 | Sendonaris et al. | 370/335 |
| 2004/0203853 A1* | 10/2004 | Sheynblat | 455/456.1 |
| 2004/0249949 A1* | 12/2004 | Gourraud et al. | 709/227 |
| 2005/0043046 A1* | 2/2005 | Lee | 455/502 |
| 2005/0048969 A1* | 3/2005 | Shaheen et al. | 455/426.1 |
| 2005/0053047 A1* | 3/2005 | Osterloh et al. | 370/344 |
| 2005/0063358 A1* | 3/2005 | Houghton et al. | 370/352 |
| 2005/0078032 A1* | 4/2005 | Gilkes | 342/357.15 |
| 2005/0135194 A1* | 6/2005 | Ishii | 368/47 |
| 2005/0138531 A1 | 6/2005 | Kim | |
| 2005/0177591 A1* | 8/2005 | Kanda et al. | 707/102 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0281231 A1 | 12/2005 | Kwon et al. | |
| 2006/0046762 A1* | 3/2006 | Yoon et al. | 455/519 |
| 2006/0067422 A1 | 3/2006 | Chung | |
| 2006/0067451 A1 | 3/2006 | Pollman et al. | |
| 2006/0125685 A1* | 6/2006 | Jeon et al. | 342/357.09 |
| 2006/0126509 A1 | 6/2006 | Abi-Nassif | |
| 2006/0159045 A1 | 7/2006 | Ananthaiyer et al. | |
| 2006/0219087 A1* | 10/2006 | Yanase et al. | 84/602 |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0133501 A1* | 6/2007 | Park | 370/350 |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0159321 A1* | 7/2007 | Ogata et al. | 340/539.12 |
| 2007/0206838 A1 | 9/2007 | Fouquet | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2007/0280098 A1* | 12/2007 | Bhatt et al. | 370/208 |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0183525 A1* | 7/2008 | Tsuji et al. | 705/7 |
| 2008/0212518 A1* | 9/2008 | Wells | 370/316 |
| 2008/0253550 A1 | 10/2008 | Ch'ng et al. | |
| 2008/0304604 A1* | 12/2008 | Oh | 375/345 |
| 2008/0318557 A1* | 12/2008 | Poulson et al. | 455/414.1 |
| 2009/0156195 A1 | 6/2009 | Humblet | |
| 2009/0161638 A1* | 6/2009 | Mullen | 370/336 |
| 2010/0066601 A1* | 3/2010 | Abraham et al. | 342/357.02 |
| 2010/0069035 A1* | 3/2010 | Johnson | 455/404.1 |
| 2010/0074180 A1* | 3/2010 | Palanki et al. | 370/328 |
| 2010/0226214 A1* | 9/2010 | Irie et al. | 368/47 |
| 2011/0110360 A1* | 5/2011 | Fenwick et al. | 370/350 |

OTHER PUBLICATIONS

Fish & Richardson, P.C., Response to Non Final Office Action mailed Nov. 30, 2011 in U.S. Appl. No. 11/958,975, filed Mar. 30, 2012 (21 pages).

Wu, Qiang et al., "cdma2000 Highly Detectable Pilot", 2008 IEEE, pp. 16-20.

$3^{rd}$ Generation Partnership Project "3GPP2", "cdma2000 High Rate Packet Data Air Interface Specification", C.S0024, version 4.0, Oct. 25, 2002 (548 pages).

3rd Generation Partnership Project "3GPP2", "cdma2000 High Rate Packet Data Air Interface Specification", C.S0024-A, version 1.0, Mar. 2004 (1083 pages).

3rd Generation Partnership Project "3GPP2", "cdma2000 High Rate Data Air Interface Specification", C.S0024-A, version 2.0, Jul. 2005 (1227 pages).

3rd Generation Partnership Project "3GPP2", "cdma2000 High Rate Data Air Interface Specification", C.S0024-B, version 1.0, Apr. 2006 (1623 pages).

3rd Generation Partnership Project "3GPP2", "cdma2000 High Rate Data Air Interface Specification", C.S0024-B, version 2.0, Mar. 2007 (1627 pages).

* cited by examiner

OBTAINING TIME INFORMATION IN A CELLULAR NETWORK

CROSS-REFERENCE TO RELATED APPLICATION

This patent application is a continuation-in-part application of U.S. patent application Ser. No. 11/958,975 titled "Absolute Time Recovery", which was filed on Dec. 18, 2007. The contents of U.S. patent application Ser. No. 11/958, 975 are hereby incorporated by reference into this application as if set forth herein in full.

TECHNICAL FIELD

This patent application relates to an access point in a cellular network obtaining time information, such as absolute time.

BACKGROUND

When connecting to a radio network, an access terminal selects an access point from available radio network access points that are within communication range. Network protocols are used in communicating between an access point and the access terminal.

The 1xRTT protocol has been standardized by the Telecommunication Industry Association (TIA) in the TIA-2000.1 through TIA-2000.6 series of specifications, which are incorporated herein by reference.

The 1xEV-DO protocol has been standardized by the TIA as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-8560B, 3GPP2 C.S0024-B, version 1.0, May 2006, and is also incorporated herein by reference. Other wireless communication protocols, such as UMTS (Universal Mobile Telecommunications Service), may also be used.

SUMMARY

This patent application describes a method, performed by an access point of a cellular network, that obtains time information. The method comprises identifying a control channel cycle boundary; at a beginning of the control channel cycle boundary, sending a request to a time server; receiving a response from the time server, the request comprising a server time; and obtaining the timing information using the server time. Obtaining the timing information includes using the server time and a first reference time to obtain an integer and a fraction; using the fraction to obtain a time difference; and using the time difference to obtain the timing information. The method may include one or more of the following features.

The timing information may comprise a time corresponding to the control channel cycle boundary. The request may be sent at a time that is delayed relative to the control channel cycle boundary. The server time may be offset from the control channel cycle boundary. The timing information may correspond to a time at the control channel cycle boundary. Using the time difference to obtain the timing information may comprise subtracting the difference from the server time to obtain a result, the result corresponding to a time at the control channel cycle boundary. The access point may be a femtocell. The time server need not know a time at the control channel cycle boundary.

The foregoing method, or any feature thereof may be implemented as a computer program product comprised of instructions that are stored on one or more machine-readable storage media, and that are executable on one or more processing devices. The foregoing method may be implemented as an apparatus or system that includes one or more processing devices and memory to store executable instructions to implement the method.

This patent application also describes a method, performed by an access point of a cellular network, for obtaining time information. The method comprises identifying a control channel cycle boundary; at a beginning of the control channel cycle boundary, sending a request to a time server; receiving a response from the time server, the request comprising a server time; and obtaining the timing information using the server time. Obtaining the timing information comprises using the server time and a first reference time to obtain an integer and a fraction, and using the integer to obtain the timing information. The method may include one or more of the following features.

Using the server time and the first reference time to obtain the integer and the fraction may comprise obtaining a difference between the server time and the first reference time, and obtaining a quotient of the difference and a predefined time interval, where the quotient comprises the integer and the fraction. Using the integer to obtain the timing information may comprise obtaining a product of the integer and a predefined time interval, and adding the product to a second predefined reference time. The timing information may comprise a time at the control channel cycle boundary. The access point may be a femtocell. The time server need not know a time at the control channel cycle boundary.

The foregoing method, or any feature thereof, may be implemented as a computer program product comprised of instructions that are stored on one or more machine-readable storage media, and that are executable on one or more processing devices. The foregoing method may be implemented as an apparatus or system that includes one or more processing devices and memory to store executable instructions to implement the method.

The details of one or more examples are set forth in the accompanying drawings and the description below. Further features, aspects, and advantages will become apparent from the description, the drawings, and the claims.

DETAILED DESCRIPTION

Figure 1:
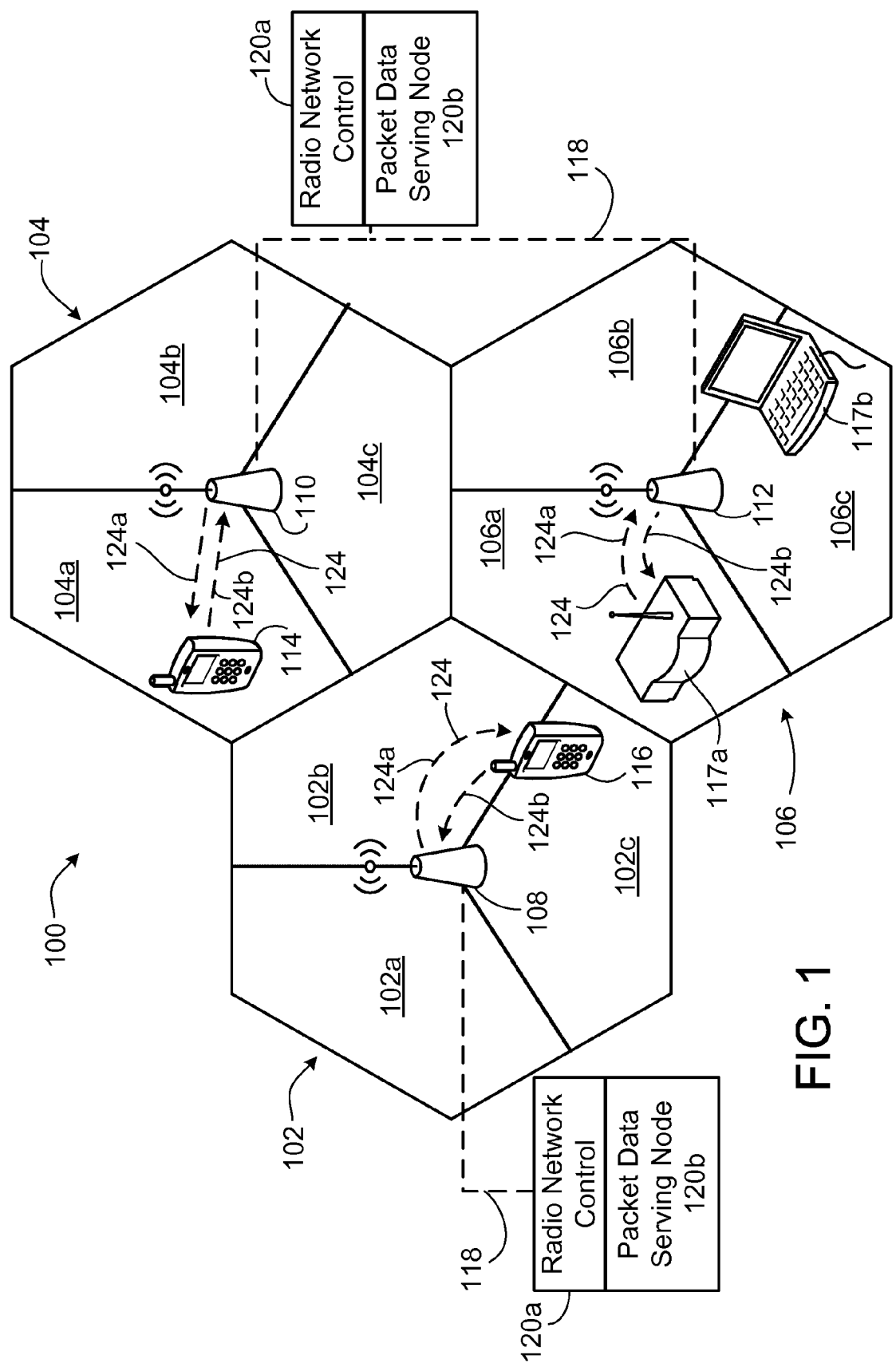
FIG. 1 is a block diagram of a network.

Referring to FIG. 1, cellular wireless communications systems, such as radio access network (RAN) 100, are designed to serve access terminals distributed in a geographic area by dividing the area into cells. At or near the center of each cell 102, 104, 106, a radio network access point, also referred to as a macro base transceiver station (BTS) 108, 110, 112, is located to serve access terminals 114, 116 (e.g., cellular telephones, laptops, PDAs). Each cell 102 may be further divided into sectors 102a-c, 104a-c, 106a-c by using sectorized antennas. A BTS 108 corresponding to a cell 102 serves one or more sectors 102a to 102c and communicates with multiple access terminals 114 within the cell 102.

RAN 100 uses the 1xEV-DO protocol to transmit data packets between an access terminal, e.g., access terminal 114 and 116, and a macro BTS, e.g., BTSs 108, 110, 112. The BTSs 108 may be connected over a backhaul connection 118 to radio network controller/packet data serving nodes (RNC/PDSN) 120a-b, which may include one or more physical devices at different locations. Although this description uses terminology from EV-DO standards, the same concepts are applicable to other communication standards, including 1xRTT, GSM, UMTS, HSDPA, WiMax, WiBro or WiFi.

The access terminals, such as access terminal 114, may be single-user devices, such as a cellular telephones and PDAs, or multiple-user devices, such as routers 117a that allow single-user devices, such as laptops 117b, to connect to the access terminals through local links (not shown). In some examples, the local links can be wired connections, e.g., Ethernet on a wired LAN, or wireless, e.g., Wi-Fi connections to a wireless local area network (LAN).

Functions of the BTS and the radio network controller (RNC) may be combined into a single device; functions of the PDSN and the radio network control (RNC) may be combined into a single device; and functions of the BTS, the RNC and the PDSN may be combined into the same device.

The implementations described herein are independent of the above combinations and the benefits apply to all combinations. References in this description to a radio access network (RAN) 100 taking action or being acted upon generally refer to a radio network control (RNC) 120a or a radio network control (RNC) 120a in combination with other devices.

Access terminals, such as access terminal 114, may be in communication with a BTS, such as BTS 108, through an air link 124. The air link 124 may include a forward link 124a (also referred to as a downlink), which carries data from a BTS 108 to an access terminal 114, and a reverse link 124b (also referred to as an uplink), which carries data from the access terminal 114 to the BTS 108.

Figure 2:
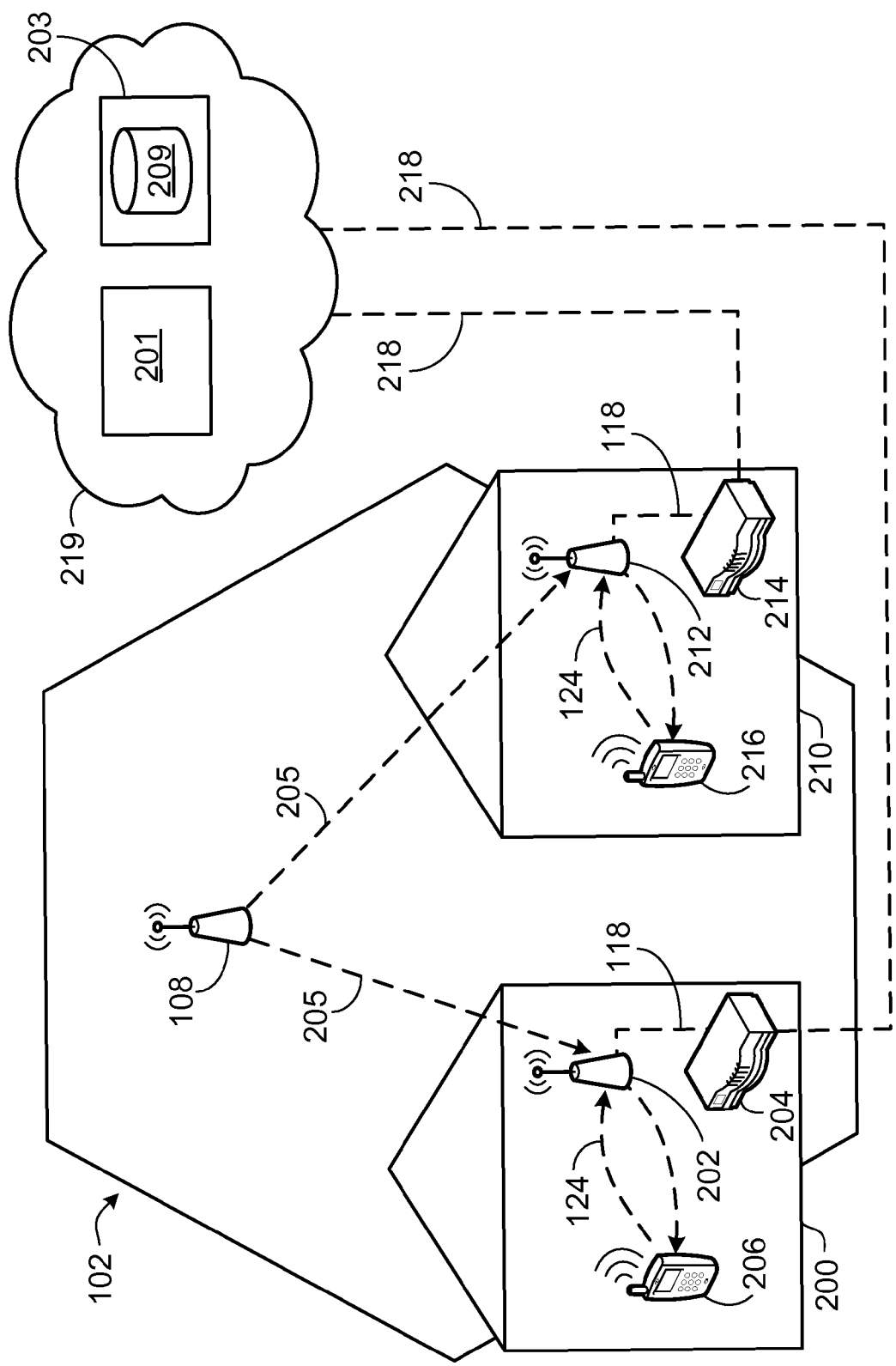
FIG. 2 is a block diagram of an access point deployment.

Referring to FIG. 2, an access point, e.g. access point 202 or 212 (which may be a femtocell or another type of private access point) may be deployed in a user's home, such as home 200, 210, in a manner similar to a WiFi® access point. The access point may be configured in a manner similar to a BTS. For example, an access point may include both a transmitter and a receiver configured to receive signals at different subbands. An access point can also be installed in an office, a public space, or a restaurant. The references in this description to an access point being in a "home" also include such locations.

A private access point, such as access point 202, may use an available high-speed Internet connection, such as a connection over a digital subscriber line (DSL) modem 204 or a cable modem 214, for connection to the backhaul 218. Such an access point may be in communication with a network 219, such as a remote network or the Internet. Generally, private access points communicate with network 219 through a backhaul connection 218, such as a DSL or a cable connection. Network 219 may include one or more remote network servers, such as servers 201 and 203. For example, server 201 may be a network time protocol server and server 203 may be for finding an offset of a sync capsule. A network database, such as database 209, may be included within at least one of the network servers, such as server 203. Database 209 may be included within the same server 201 as a time server or network server database 209 may include the time server.

When an authorized access terminal, such as access terminals 206, 216, is inside a home (or anywhere within range of access point 202), the authorized access terminal uses access point 202 rather than the macro BTS 108 to place or receive voice calls and/or to establish data connections. Access point 202 may be integrated into, or connected to, a cable modem 204, a WiFi access point (not shown), or other network hardware (such as router 117a in FIG. 1). Some details and examples are discussed in co-pending application Ser. No. 11/640,501, titled Provisioning Private Access Points for Wireless Networking, and Ser. No. 11/640,503, titled Configuring Preferred User Zone Lists for Private Access Points for Wireless Networking, both filed Dec. 15, 2006, both incorporated by reference as if set forth herein in full.

In general, the 1xEv-DO protocol provides for digital messages, such as messages transmitted over the air link 124, to be communicated to and from one or more access terminals 114 and macro BTSs, such as macro BTS 108, in RAN 100. Messages transmitted over the air link 124 may report status of the access terminals 114, send requests to a macro BTS, adjust configurations of the access terminals 114, and transmit user data. Such messages may be used for other purposes as well.

Access points 202, 212 may be configured to receive radio signals 205 from a macro BTS 108. Accordingly, in some examples, access points 202 and 212 do not transmit signals to the macro BTS, but rather listen to radio signals 205 transmitted by the macro BTS 108.

Digital messages from the macro BTSs are communicated as "chips," which form the basic signal elements in a code division multiple access (CDMA) waveform. The 1xEv-DO protocol may provide for transmission of up to 1.2288 million chips per second.

Macro signals in environments of the access terminals, which normally provide timing information, may be weak. For this reason, it may be difficult to decode sync messages included in macro signals for CDMA communication. Accordingly, it is desirable to recover absolute time from the timing pattern of weak macro signals provided by a BTS. A process for obtaining this absolute time is described below with respect to FIGS. 3 to 7.

Figure 3:
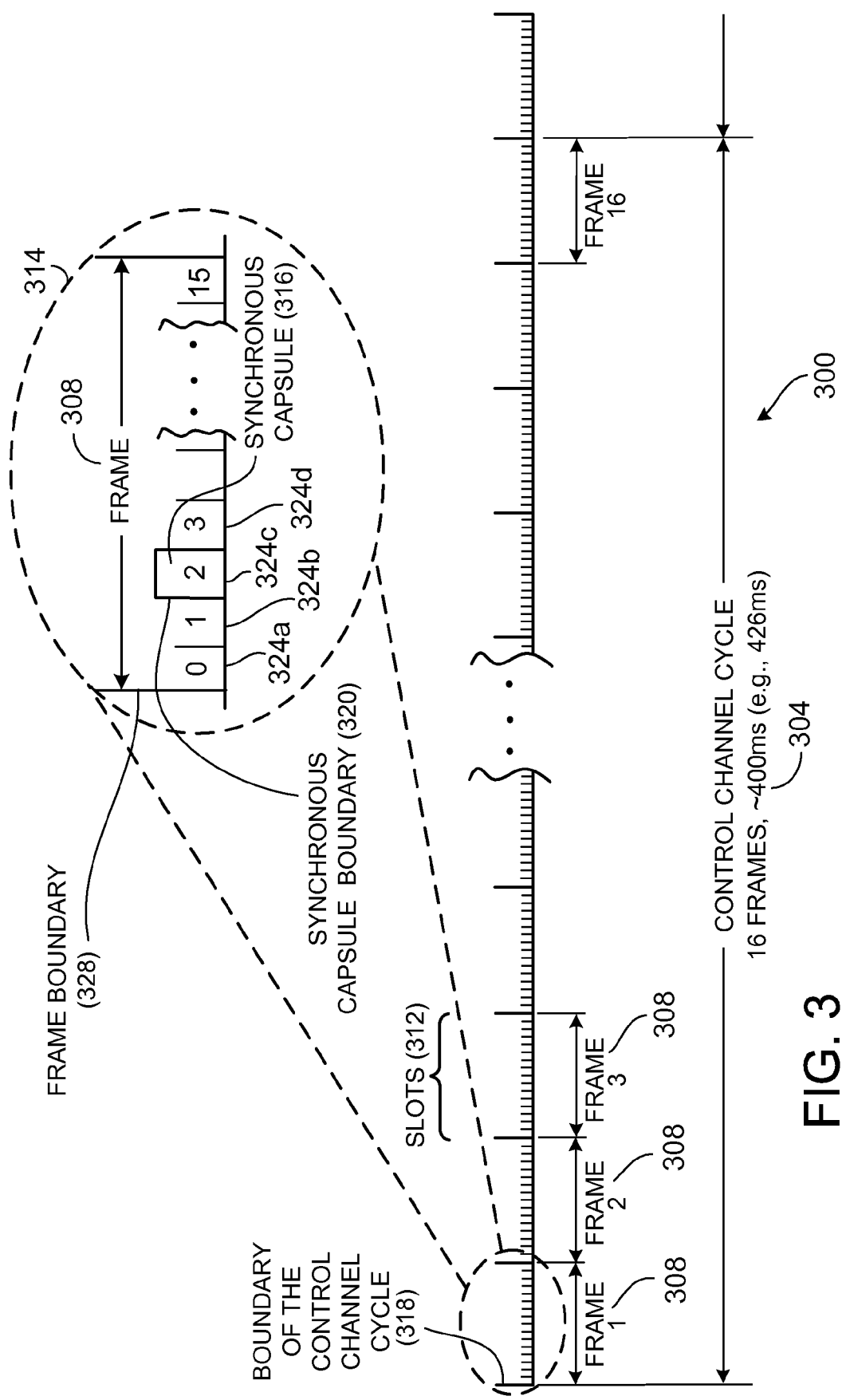
FIGS. 3 and 4 are timing diagrams.

Referring to FIG. 3, a macro signal 300 transmitted over an air link, such as air link 124, is organized as macro signal frames 308. The macro signal frames 308 are aligned in the same manner for all sectors 102a in one or more cells 102.

Figure 4:
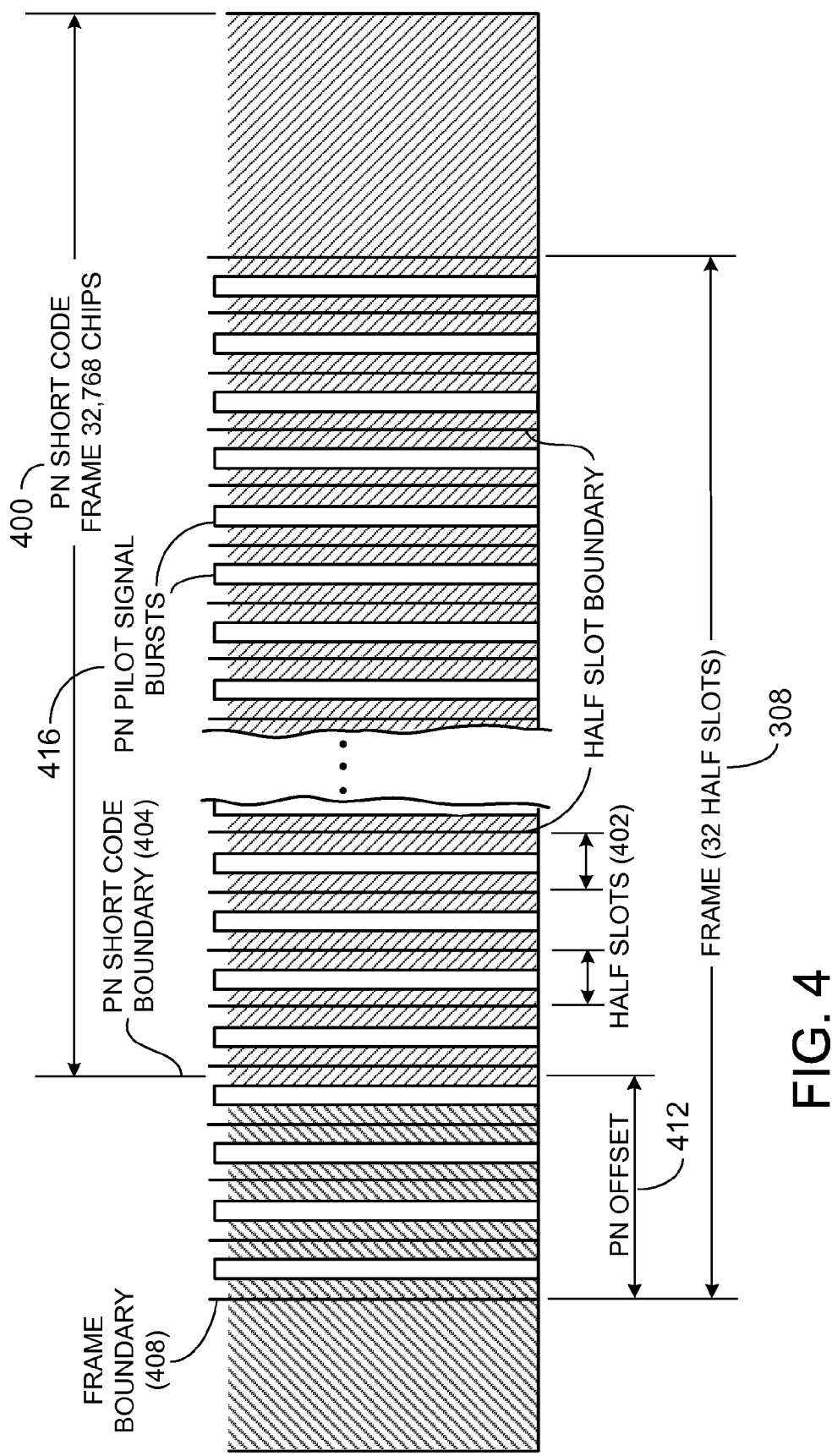

Referring to FIG. 4, in general, the 1xEV-DO protocol provides that a macro signal frame 308 includes 32 half-slots 402 having 1,024 chips each, so that duration of a macro signal frame 308 is 32,768 chips. The 1xEV-DO protocol also provides for a pilot signal based on a short complex pseudo-noise (PN) code or sequence ("PN short code") 400 that repeats every 32,768 chips but that is only transmitted in the 96 central chips, i.e., chips 464 to 559, of each half slot. A boundary 404 of the PN short code 400 is offset from a boundary 408 of the macro signal frame 308 by a PN offset 412. The PN offset 412 may be substantially unique for each sector 102a in the local environment of access point 202, at a given carrier frequency. The 1xEv-DO protocol provides for 512 PN offsets, often referred to as PN offset indices 0 to 511. Accordingly, the PN offset indices are separated from each other by 64 chips.

Referring again to FIG. 3, each of the macro signals 300 includes a series of control channel cycles, e.g., multiple occurrences of control channel cycle 304. Here, control channel cycle 304 in macro signal 300 from the macro BTS 108 includes a sequence of 16 macro signal frames 308, each having a predetermined number of slots 312. Accordingly, the control channel cycle 304 occurs every 16 frames or about 400 ms. The control channel cycles 304 may be aligned in the same manner for all sectors in one or more cells 102.

As shown in an enlarged view 314 of frame 308, macro BTS 108 sends a synchronous capsule 316 of a predetermined length, within 0-3 slots offset from a start 318 of each control channel cycle 304. The synchronous capsule 316 may be spread over non-contiguous slots that are spaced apart from each other by a predetermined number of slots, e.g., 4 slots. In the enlarged view 314, only a first slot of the synchronous capsule 316 is shown. The synchronous capsule 316 typically includes control information transmitted at 38.4 or 76.8 kb/s, scrambled with the PN short code 400.

The boundary 320 of the synchronous capsule 316 is at the beginning of one of the first four slots 324a-d (slots 0, 1, 2 and 3) immediately following the boundary 328 of the first macro signal frame 308 in the control channel cycle 304. The location of the boundary 320 of the synchronous capsule 316 may depend on the sector 102a. The 1xEV-DO protocol provides that the position of the boundary 320 of the synchronous capsule 316 is indicated by a data chip sequence or a preamble comprising 1,024 (for a chip rate of 38.4 kb/s) or 512 (for a chip rate 76.8 kb/s) chips. Accordingly, the preamble is a 64-chip signed Walsh cover corresponding to specialized indices, e.g., Medium Access Control (MAC) indices 2 or 3. The Walsh covers may be [+1 −1 +1 −1 . . . ] and [−1 +1 −1 +1 . . . ] sequences.

Since there are 800 available data chips in each half-slot 402, the preamble of the synchronous capsule 316 extends over a predetermined portion belonging to one or two half-slots 402. In general, references to timing boundaries in this description refer to one or more boundaries in the macro signal 300, such as, for example, boundaries of half-slots 402, frames 308, synchronous capsules 316 and control channel cycles 304.

Absolute time is generally determined relative to a standard. For example, the 1xEV-DO provides a CDMA system time of Jan. 6, 1980 00:00:00 UTC (Coordinated Universal Time, also the beginning of GPS time) as the start time of a control channel cycle 304 that is substantially the same across one or more sectors 102a in one or more cells 102.

The 1xEV-DO protocol provides that a BTS transmits a synchronization macro signal, e.g., a sync message, in at least every three synchronous capsules. The sync message contains an indication of the current time expressed in number of macro signal frames 308 since the time origin as well as a value of a PN offset 412. Each access point may be configured to decode the sync message to thereby obtain the absolute time.

The process of synchronizing an access point, such as access point 202, typically has two aspects. In a first aspect known as frequency synchronization, the chip rate used by the access point 202 matches the chip rate used in the macro signal 300. This may be accomplished by processing a pilot portion, such as the pilot signal based the short PN code 400, of the macro signal 300. In a second aspect, known as absolute time synchronization, the access point 202 associates an absolute time of transmission with each chip it receives. This may be accomplished by associating an absolute, e.g., UTC, time with an identifiable chip, such as the start of the control channel cycle 318 or boundary 328 of frame 308.

The access point 202 determines the location of the boundary 404 of the PN short code 400 in the macro signal 300. Various methods for synchronizing the access point 202 to pilot using the PN short code 400, and determining the position of the boundary 404 of the PN short code 400 and the position of the half slot boundaries are known to persons skilled in the art.

The access point 202 determines the location of the boundary 404 of the PN short code 400 by correlating the pilot portion of the macro signal 300 that is received (oversampled at a multiple X of the chip rate, e.g., X=1 or 2 times the chip rate) with delayed copies of a PN short code generated by the access point 202 and locating a region of significant peaks (for example, a region of width, W).

In some situations, an initial clock frequency of the access point 202 does not match that used by the macro base transceiver station 108. As a result, it is not possible to correlate coherently over long periods of time. If the relative frequency error does not exceed $10^{-6}$, which can be achieved by temperature compensated crystal oscillators, coherent correlation is possible over 96 pilot chips in a half slot. As the frequency error decreases, coherent correlation can be effected on groups of several consecutive half slots. Correlation across these groups can be done by using non coherent accumulation, or by performing coherent modulation with a set of hypothesized frequency errors.

The access point 202 obtains a power profile of a channel response over a window region W while correlating the macro signal 300 that is received from the macro base transceiver station 108 to the delayed copies of the PN short code 400. The power profile is obtained in a manner similar to a moving average. However, if time drift compensation is not implemented, the frequency error also contributes to a non-coherent accumulation of an energy profile during the correlation process because a $10^{-6}$ error translates into a 1.25 chip offset per second. The maximum accumulation time is of the order of 800/X ms in order to achieve accurate channel delay power profile.

In some examples, the access point 202 acquires the macro signals 300 of all base transceiver stations 108 within range of the access point 202. The access point 202 then detects the pilot signal of the PN short code 400 corresponding to the strongest macro signal 300 from a macro base transceiver station 108. Subsequently, the access point 202 begins to look for the second strongest macro signal (not shown), possibly after canceling the strongest macro signal 300.

Figure 8:
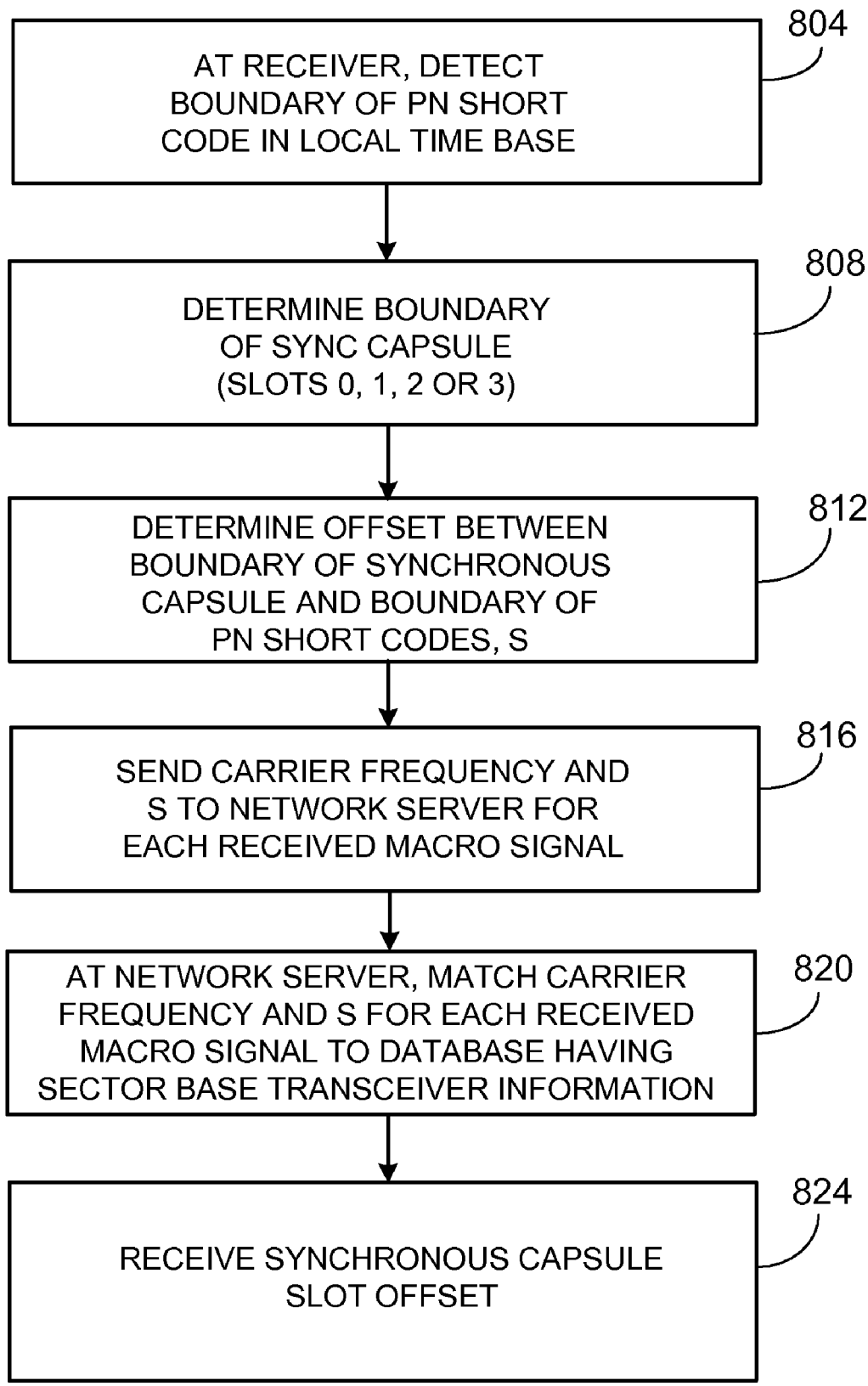
FIG. 8 is a flowchart showing a process that includes determining a start of a control channel cycle boundary.

Referring to FIG. 8, the access point 202 uses the correlation process described above to determine the boundary 404 or the beginning of the PN short code 400 in a time base that is local to the access point 202 (804 of FIG. 8). The macro signal frame 308 typically begins at a half-slot boundary 420. Accordingly, there are 32 possible positions for the boundary 408 of the macro signal frame 308. (PN offset modulo 1,024 chips=32 possibilities)

Subsequently, the access point 202 determines the boundary 320 of the synchronous capsule 316 by detecting a predetermined chip sequence (808 of FIG. 8). In some examples, the access point 202 processes at least a predetermined number, e.g., 512, of simultaneous chips corresponding to the length of the preamble of the synchronous capsule 316 to determine the location of the boundary 320 of the synchronous capsule 316.

In some examples, the access point 202 determines the location of the boundary 320 of the synchronous capsule 316 by known processing techniques, such as rake filtering, PN despreading and multiplying an in-phase component (PNI component) of the PN short code 400 by the [+1 −1 +1 −

1 . . . ] or [−1 +1 −1 +1 . . . ] synchronous capsule pre accumulating over a predetermined number, e.g., 512, of chips. The accumulation can be effected over many successive synchronous capsules.

The synchronous capsule boundary is offset from the control channel boundary by a number of slots varying between 0 and 3 (324*a*-*d* of FIG. 3).

If the macro signal 300 is strong enough, the access point 202 decodes the synchronous capsule 316, and eventually the sync message, which contain enough information to obtain the UTC time at the macro base transceiver station 108 at the start of the current control channel cycle 304. With this information, the absolute time of all subsequent chips and macro signal frames 308 can be determined.

In some examples, the macro signal 300 is too weak for the receiver 202 to decode the sync message. In such situations, the receiver 202 exploits one or more timing patterns in the macro signal 300 to retrieve the position of a control channel cycle boundary with the help of the server 203.

In some examples, if the access point 202 is within range of the macro signals 300 from a predetermined number of distinct macro base transceiver stations 108, corresponding to the smallest and largest possible values for the synchronous capsule slot offsets 324*a*-*d*, then further processing is not needed.

In these situations, the start time of the current control channel cycle 304 is known from the position of the synchronous capsule slots 324*a*-*d* with smallest offset. Accordingly, the access point 202 only needs to request a start time for the current control channel cycle 304 from the server 201.

However, if the predetermined number of distinct macro signals 300 are unavailable, the access point 202 will need to take the assistance of the network server database 209 in the server 203 as described in further detail below.

The access point 202 then measures the offset between the boundary of the synchronous capsule and the boundary of the PN short code, S (812 of FIG. 8). In some examples, the interference from strong macro signals while detecting the boundary 320 of the synchronous capsule 316 in a weak macro signal 300 cannot be cancelled. However, in these situations, only one synchronous capsule 316 in a weak macro signal 300 needs to be detected. As such, the effect of the interference is minimal.

The access point 202 then sends the carrier frequency of a macro signal, e.g. macro signal 300 corresponding to sector 102*a*, and the offset S corresponding to the distance between the boundary 320 of the synchronous capsule 316 and the boundary 328 of the macro signal frame 308 to the server 203 (816 of FIG. 8). In some examples, the access point 202 sends several such offsets, corresponding to different macro signals to the server 203.

In some examples, the access point 202 also sends a "PN offset delta" that is the difference, expressed as a multiple of 64 chips, between a boundary 404 of the PN short code 400 of a first sector 102*a* of the cell 102 and a boundary of a PN short code of a second sector 102*b* of the cell 102, as well as their carrier frequencies, to the server 203. Accordingly, the first sector 102*a* is designated a reference sector and a subsequently acquired sector, e.g., the second sector 102*b*, is designated a current sector. The second sector 102*b* can also transmit 1xRTT signals as it uses a PN short code 400 that is compatible with that of the 1xEV-DO protocol.

The database 209 includes information about all the sectors 102*a* and/or macro base transceiver stations 108. In some implementations, the database 209 is also configured to store location information of the access point 202. For example, the database 209 is configured to store a street address, a zip code or, in some situations, latitude and longitude information. In some implementations, the location information is provided by a service manager, or the access point 202 itself.

At the server 203, at least one of the carrier frequency, the offset and the PN offset delta for each received macro signal 300 is matched with the network server database 209 (820 of FIG. 8). The server 203 then returns information based on the frequency, offset and PN offset delta for each macro signal 300. For example, the server 203 returns the synchronous capsule slot offset, e.g., one of slot offsets 324*a*-*d*, to the access point 202 (824 of FIG. 8), belonging to the macro signal 300 corresponding to at least one sector 102*a* within range of the access point 202.

In some examples, the access point 202 receives macro signals 300 from macro base transceiver stations 108 corresponding to three sectors 102*a*. As shown in Table 1, the access point 202 acquires three distinct macro signals 300, e.g., entries 1, 2 and 3 (column 1), having frequencies F1, F2, and F2, respectively (column 2).

TABLE 1

Information received by an access point 202 in a radio access network (RAN)

| Entry (1) | Frequency (2) | S (3) | PN offset delta (4) |
|---|---|---|---|
| 1 | F1 | 33 | 0 |
| 2 | F2 | N/A | 11 |
| 3 | F2 | N/A | 35 |

As described above, the access point 202 determines the offset, S (column 3) between the boundary 320 of the synchronous capsule 316 and the boundary 404 of the PN short code 400, expressed as a multiple of 64 chips. In some examples, the access point 202 also determines the PN offset delta (column 4) for a sector, e.g. sector 102*b*, by computing the distance between the boundary 404 of the PN short code 400 corresponding to sector 102*b* and the boundary 404 of the PN short code 400 corresponding to the first sector, e.g., 102*a*, which is used as a reference sector.

The database 209 in the server 203 includes information for all the sectors, e.g., 102*a*-*c*, 104*a*-*c* and 106*a*-*c*, corresponding to the cells 102, 104 and 106, of the radio access network (RAN) 100. For example, information is stored in the database 209 as shown in Table 2. In some examples, the database 209 can also include information about the access points 202 such as rough geographical location, e.g., street name/address, zip code or latitude and longitude information.

As shown, the database 209 includes a sector number or ID (column 1), a carrier frequency of the macro base transceiver station 108 corresponding to the sector 102 (column 2), the PN offset 412 (column 3), the synchronous capsule slot offset 324*a*-*d* (column 4) and the offset, S (column 5) between the boundary 320 of the synchronous capsule 316 and the boundary 404 of the PN short code 400, expressed in multiples of 64 chips, modulo 512, for each sector 102*a*.

TABLE 2

Information contained in a network server database

| Sector (1) | Frequency (2) | PN offset (3) | Slot offset (4) | S(5) |
|---|---|---|---|---|
| 1 | F1 | 45 | 3 | 461 |
| 2 | F1 | 65 | 1 | 33 |
| 3 | F1 | 68 | 2 | 4 |
| 4 | F2 | 76 | 0 | 76 |

TABLE 2-continued

Information contained in a network server database

| Sector (1) | Frequency (2) | PN offset (3) | Slot offset (4) | S(5) |
|---|---|---|---|---|
| 5 | F2 | 98 | 1 | 66 |
| 6 | F2 | 100 | 0 | 100 |

In some implementations, the server 203 matches a value, e.g., value 33, received from an access point 202 with the entry of the offset, S (column 5) corresponding to sector 2 (column 1) in the database 209. The server 203 then returns a slot offset 324a-d (column 4) to the access point 202. In these implementations, there is only one match having the offset, S (column 5) being 33. In some implementations, there can be several such matches.

In some examples, an ambiguity can also be resolved by using the PN offset differences received from access point 202. Accordingly, in some implementations, the server 203 determines values for the PN offset delta (column 4) for at least three entries corresponding to distinct macro signals 300 as being 0, 11, and 35.

Referring once again to Table 2, the difference between the PN offset for sector 1, at frequency, F1, and the PN offsets for sectors 4, 5, and 6, at frequency, F2, are 31, 53 and 55. Also, the difference between the PN offset for sector 2, at frequency, F2, and the PN offsets for sectors 4, 5, and 6, at frequency, F2 are 11, 33 and 35, respectively.

As a result, the server 203 successfully matches the PN offset delta determined by the access point 202, as shown in Table 1, with the difference between the PN offset for sector 2 and the PN offsets for sectors 4, 5 and 6, respectively. In such situations, the server 203 matches entry 1 (of Table 1) with sector 2 (of Table 2), entry 2 with sector 4 and entry 3 with sector 6. Subsequently, the server 203 returns the slot offset of one sector, i.e. that of sector 2 (the first macro signal acquired by the receiver 202,) to the access point 202.

In some examples, the value of the offset, S is used to directly identify possible reference sectors as described in the first set of examples, and the PN offset matching technique described in the second set of examples is used to identify a correct reference sector.

Obtaining Absolute Time from an NTP Server

To associate an absolute, e.g., UTC, time with an identifiable chip, such as the start of the control channel cycle 318 or boundary 328 of frame 308, the access point obtains the absolute time. The absolute time may be obtained from a time server, such as a network time protocol (NTP) server, as long as the propagation delay from the access point to the server does not exceed a control channel cycle duration. Processes for obtaining the absolute time are described below.

Figure 5:
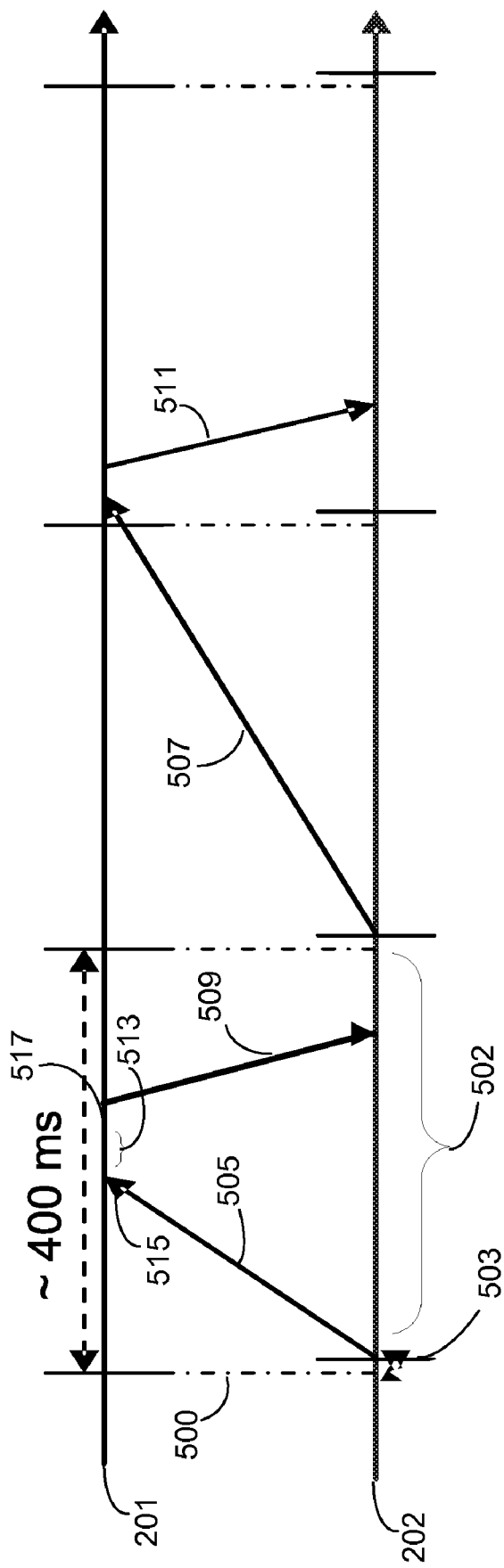
FIG. 5 is a timing diagram showing a request/response protocol according to which an access point obtains time from a time server.
Figure 6:
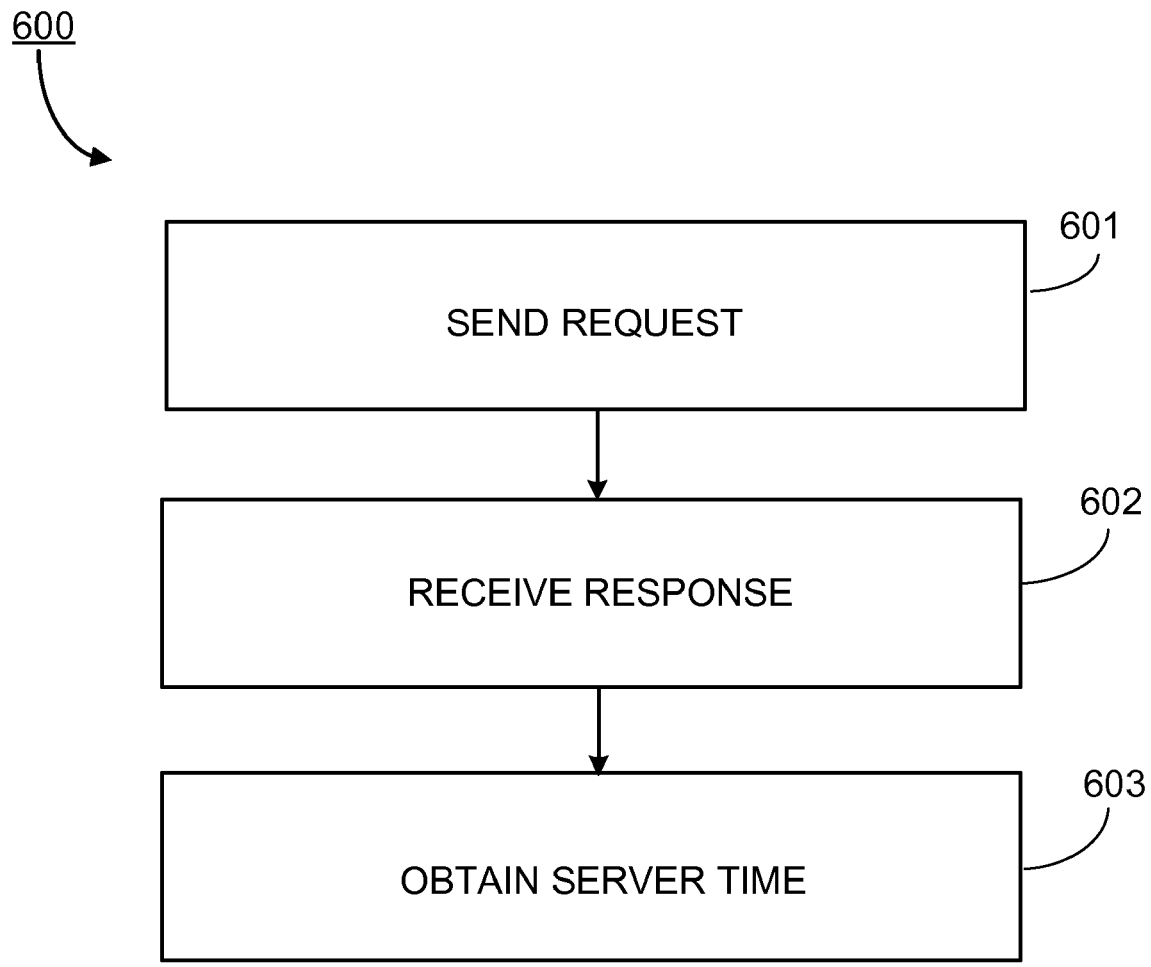
FIG. 6 is a flowchart showing a process by which the access point obtains timing information from the time server.

Referring to FIGS. 5 and 6, access point 202 (e.g., a femtocell) may identify the start time of the control channel cycle 318 in accordance with process 600 of FIG. 6.

At about the beginning of a CDMA control channel cycle boundary 500, access point 202 sends (601) a request to an NTP server 201 for the current time. Access point 202 and NTP server 201 are identified by their respective time lines in FIG. 5. Due to radio delay 503, the request is not sent at precisely the beginning of the CDMA control channel cycle boundary, but rather at some time thereafter. The NTP server may be a standard NTP server, which does not require special protocols or knowledge of the CDMA control channel cycle boundary and may, or may not, be part of other network hardware. Any type of NTP server may be used. The request by access point 202 is depicted by arrow 505, going from access point 202 to NTP server 201. Another such request is depicted by arrow 507.

NTP server 201 receives the request, and responds with the current time, which is referred to as the "server time". The response by NTP server 201 is depicted by arrow 509, going from NTP server 201 to access point 202. Another such response is depicted by arrow 511. As depicted in FIG. 5, there is a small lag 513 between the time 515 that NTP server 201 receive the request from access point 202 and the time 517 that NTP server 201 responds.

Access point 202 receives (602) the response from NTP server 201. The response includes server time 517. Access point 202 obtains (603) the CDMA control channel cycle boundary time (timing information) using server time 517. In this implementation, access point 202 executes code, which may be stored on access point 202, to obtain the CDMA control channel cycle boundary. However, such code may be executed elsewhere to provide access point 202 with the CDMA control channel cycle boundary.

Figure 7:
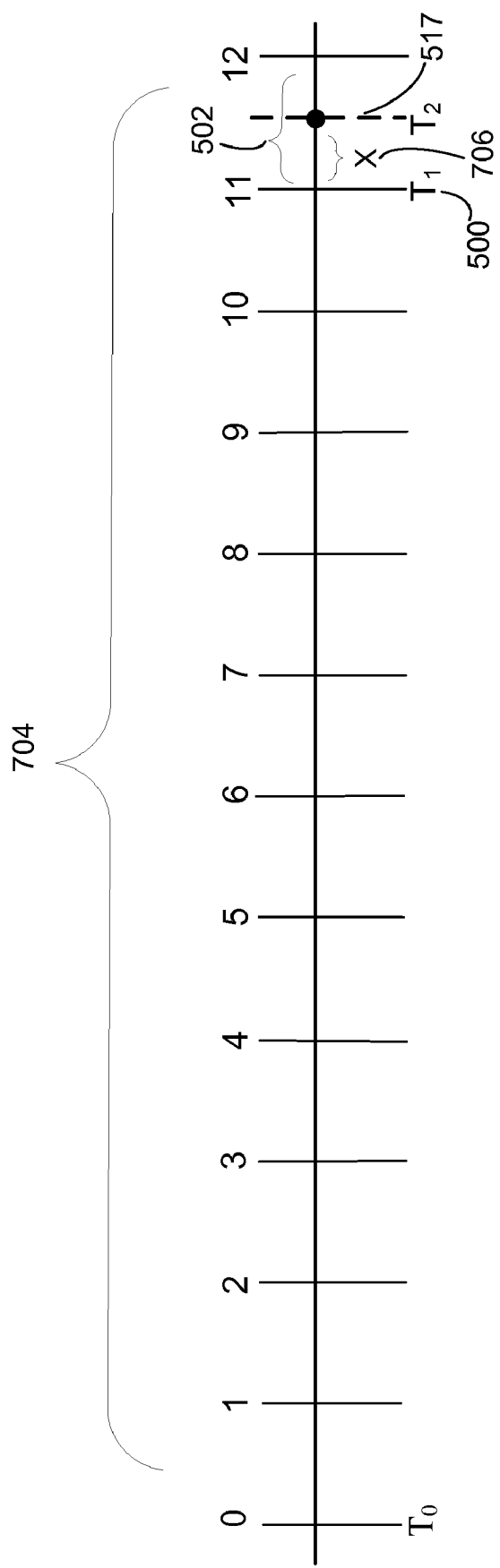
FIG. 7 is a timing diagram showing time intervals from a predefined reference time to, and including, a control channel cycle boundary and a time after that boundary at which the time server provides the time to the access point.

The CDMA control channel cycle boundary time may be determined with respect to a reference time. In this example, a reference time is Jan. 6, 1980. Time since the reference time is divided into time intervals which, in this case, are about 400 millisecond intervals (ms). These 400 ms intervals correspond to CDMA control channel cycles. FIG. 7 depicts this graphically. That is, $T_0$ corresponds to Jan. 6, 1980. $T_2$ corresponds to server time 517 (from FIG. 5). $T_2$ is within CDMA control channel cycle 502, as in FIG. 5. $T_1$ corresponds to the CDMA control channel cycle boundary 500 that access point 202 is configured to determine using the server time.

Access point 202 may use one of several processes to determine a time at the CDMA control channel cycle boundary 500. For example, access point 202 may use the server time and a first reference time to obtain an integer and a fraction, use the fraction to obtain a time difference; and use the time difference to obtain the timing information. In more detail, access point 202 may determine the absolute (e.g., not local) time at the CDMA control channel cycle boundary as follows. Access point 202 determines the number of CDMA control channel cycles 704 since the reference time as follows:

$(T_2 - T_{Jan. 6, 1980})/0.4s = $ Integer $(N)$ + Fraction $(x/0.4s)$

That is, the integer N in this case corresponds to the number of CDMA control channel cycles 704 since the reference time. The value of "x" corresponds to the difference 706 between the CDMA control channel cycle boundary $T_1$ and $T_2$. To obtain the time at the CDMA control channel cycle boundary, access point 202 multiplies the Integer, N, by the time interval, here 400 ms. Access point 202 may normalize the product of N and 400 ms with respect to the second reference time to obtain the time at CDMA control channel cycle boundary 500. For example, if the access point uses an internal time that is not based on a reference time, such as Jan. 6, 1980, the access point can obtain an absolute time by adding an offset (e.g., a second reference time, such as Unix® time or Windows® time) to the product of N and 400 ms.

In an alternative process, access point 202 may multiply the fraction above, x/0.4s, by 0.4s to obtain x, which corresponds to the difference 706 between the CDMA control channel cycle boundary $T_1$ (500) and $T_2$ (517). Access point 202 may then subtract x from $T_2$ to obtain $T_1$.

Process 600 is described in the context of a femtocell and an NTP server; however, it may be used with any type(s) of access point(s) and/or time server(s).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device such as a computer-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the techniques described herein can be performed by one or more programmable processors executing a computer program to perform functions described herein by operating on input data and generating output. Actions associated with the techniques can also be performed by, and apparatus for implementing the techniques can include, e.g., special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The computing system can include clients and servers. A client and server are generally remote from each other and typically interact over a communication network. The relationship of client and server arises by virtue of computer programs running on the respective computers and having a client-server relationship to each other.

Components of different embodiments described herein may be combined to form other embodiments not specifically set forth above. Any features described herein may be combined with features found in U.S. application Ser. No. 11/958,975.

Other embodiments not specifically described herein are also within the scope of the following claims.

What is claimed is:

1. A method, performed by an access point of a cellular network, for obtaining time information, the method comprising:
    identifying a control channel cycle boundary;
    at a beginning of the control channel cycle boundary, sending a request to a time server;
    receiving a response from the time server, the response comprising a server time; and
    obtaining the timing information using the server time;
    wherein obtaining the timing information comprises:
        determining, based on the server time, a value corresponding to (i) a number of control channel cycles since a reference time and (ii) a fraction;
        multiplying the fraction by a constant to obtain a time difference between the control channel cycle boundary and the server time; and
        subtracting the time difference from the sever time.

2. The method of claim 1, wherein the timing information comprises a time corresponding to the control channel cycle boundary.

3. The method of claim 1, wherein the request is sent at a time that is delayed relative to the control channel cycle boundary; and
    wherein the timing information corresponds to a time at the control channel cycle boundary.

4. The method of claim 1, wherein the reference time comprises a predefined time plus an offset.

5. The method of claim 4, wherein the access point comprises a femtocell; and
    wherein the time server does not know a time at the control channel cycle boundary.

6. A method, performed by an access point of a cellular network, for obtaining time information, the method comprising:
    identifying a control channel cycle boundary;
    at a beginning of the control channel cycle boundary, sending a request to a time server;
    receiving a response from the time server, the response comprising a server time; and
    obtaining the timing information using the server time;
    wherein obtaining the timing information comprises:
        using the server time and a first reference time to obtain an integer and a fraction; and
        using the integer to obtain the timing information;
    wherein using the server time and the first reference time to obtain the integer and the fraction comprises:
        obtaining a difference between the server time and the first reference time and
        obtaining a quotient of the difference and a predefined time interval, the quotient comprising the integer and the fraction; and
    wherein using the integer to obtain the timing information comprises:
        obtaining a product of the integer and a predefined time interval; and
        adding the product to a second predefined reference time.

7. The method of claim 6, wherein the timing information comprises a time at the control channel cycle boundary.

8. One or more machine-readable storage media comprising instructions that are executable by an access point of a cellular network to obtain time information, the instructions for:
    identifying a control channel cycle boundary;
    at a beginning of the control channel cycle boundary, sending a request to a time server;
    receiving a response from the time server, the response comprising a server time; and obtaining the timing information using the server time;
wherein obtaining the timing information comprises:
    determining, based on the server time, a value corresponding to (i) a number of control channel cycles since a reference time and (ii) a fraction;
    multiplying the fraction by a constant to obtain a time difference between the control channel cycle boundary and the server time; and
    subtracting the time difference from the sever time.

9. The one or more machine-readable storage media of claim 8, wherein the timing information comprises a time corresponding to the control channel cycle boundary.

10. The one or more machine-readable storage media of claim 8, wherein the request is sent at a time that is delayed relative to the control channel cycle boundary; and
    wherein the timing information corresponds to a time at the control channel cycle boundary.

11. The one or more machine-readable storage media of claim 8, wherein the reference time comprises a predefined time plus an offset.

12. The one or more machine-readable storage media of claim 11, wherein the access point comprises a femtocell; and
    wherein the time server does not know a time at the control channel cycle boundary.

13. One or more machine-readable storage media comprising instructions that are executable by an access point of a cellular network to obtain time information, the instructions for:
    identifying a control channel cycle boundary;
    at a beginning of the control channel cycle boundary, sending a request to a time server;
    receiving a response from the time server, the response comprising a server time; and
    obtaining the timing information using the server time;
    wherein obtaining the timing information comprises:
        using the server time and a first reference time to obtain an integer and a fraction; and
        using the integer to obtain the timing information;
    wherein using the server time and the first reference time to obtain the integer and the fraction comprises:
        obtaining a difference between the server time and the first reference time and
        obtaining a quotient of the difference and a predefined time interval, the quotient comprising the integer and the fraction; and
    wherein using the integer to obtain the timing information comprises:
        obtaining a product of the integer and a predefined time interval; and
        adding the product to a second predefined reference time.

14. The one or more machine-readable storage media of claim 13, wherein the timing information comprises a time at the control channel cycle boundary.

15. A method, performed by an access point of a cellular network, for obtaining time information, the method comprising:
    identifying a control channel cycle boundary;
    at a beginning of the control channel cycle boundary, sending a request to a time server;
    receiving a response from the time server, the response comprising a server time; and
    obtaining the timing information using the server time;
    wherein obtaining the timing information comprises:
        using the server time and a first reference time to obtain an integer and a fraction; and
        using the integer to obtain the timing information;
    wherein using the server time and the first reference time to obtain the integer and the fraction comprises:
        obtaining a difference between the server time and the first reference time; and
        obtaining a quotient of the difference and a predefined time interval, the quotient comprising the integer and the fraction; and
    wherein using the integer to obtain the timing information comprises:
        obtaining a product of the integer and a predefined time interval.

16. One or more machine-readable storage media comprising instructions that are executable by an access point of a cellular network to obtain time information, the instructions for:
    identifying a control channel cycle boundary;
    at a beginning of the control channel cycle boundary, sending a request to a time server;
    receiving a response from the time server, the response comprising a server time; and
    obtaining the timing information using the server time;
    wherein obtaining the timing information comprises:
        using the server time and a first reference time to obtain an integer and a fraction; and
        using the integer to obtain the timing information;
    wherein using the server time and the first reference time to obtain the integer and the fraction comprises:
        obtaining a difference between the server time and the first reference time; and
        obtaining a quotient of the difference and a predefined time interval, the quotient comprising the integer and the fraction; and
    wherein using the integer to obtain the timing information comprises:
        obtaining a product of the integer and a predefined time interval.

* * * * *

UNITED STATES PATENT AND TRADEMARK OFFICE
CERTIFICATE OF CORRECTION

| | |
|---|---|
| PATENT NO. | : 8,379,625 B2 |
| APPLICATION NO. | : 12/343850 |
| DATED | : February 19, 2013 |
| INVENTOR(S) | : Pierre A. Humblet |

It is certified that error appears in the above-identified patent and that said Letters Patent is hereby corrected as shown below:

In the Claims:

Column 12, Line 47, In Claim 6, delete "time and" and insert -- time; and --, therefor.

Column 13, Line 43 (approx.), In Claim 13, delete "time and" and insert -- time; and --, therefor.

Signed and Sealed this
Seventh Day of May, 2013

Teresa Stanek Rea
*Acting Director of the United States Patent and Trademark Office*